(12) United States Patent
Zhang et al.

(10) Patent No.: US 10,221,345 B2
(45) Date of Patent: Mar. 5, 2019

(54) SEALING ADHESIVE, ITS PREPARATION METHOD, AND LIQUID CRYSTAL DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Bo Zhang, Beijing (CN); Cong Tan, Beijing (CN); Chengyong Zhan, Beijing (CN)

(73) Assignees: BOE Technology Group Co., Ltd., Beijing (CN); Hefei Xinsheng Optoelectronics Technology Co., Ltd., Hefei (CN)

(*) Notice: Subject to any disclaimer, the term of this patent is extended or adjusted under 35 U.S.C. 154(b) by 27 days.

(21) Appl. No.: 15/560,419

(22) PCT Filed: Mar. 30, 2017

(86) PCT No.: PCT/CN2017/078780
§ 371 (c)(1),
(2) Date: Sep. 21, 2017

(87) PCT Pub. No.: WO2017/177827
PCT Pub. Date: Oct. 19, 2017

(65) Prior Publication Data
US 2018/0187055 A1 Jul. 5, 2018

(30) Foreign Application Priority Data

Apr. 14, 2016 (CN) .......................... 2016 1 0232626

(51) Int. Cl.
*C09J 163/00* (2006.01)
*G02F 1/1339* (2006.01)
(Continued)

(52) U.S. Cl.
CPC ........ *C09J 163/00* (2013.01); *C08G 59/1477* (2013.01); *C09K 3/1021* (2013.01);
(Continued)

(58) Field of Classification Search
CPC ..................................................... C09J 163/00
See application file for complete search history.

(56) References Cited

U.S. PATENT DOCUMENTS

| 5,596,024 A | 1/1997 | Horie et al. |
| 2015/0267096 A1 | 9/2015 | Wang et al. |

FOREIGN PATENT DOCUMENTS

| CN | 1651542 A | 8/2005 |
| CN | 102746487 A | 10/2012 |

(Continued)

OTHER PUBLICATIONS

Jul. 6, 2007—(WO) International Search Report and Written Opinion Appn PCT/CN2017/078780 with English Tran.
(Continued)

*Primary Examiner* — Daniel H Lee
(74) *Attorney, Agent, or Firm* — Banner & Witcoff, Ltd.

(57) ABSTRACT

Disclosed are a sealing adhesive and a method of making the same, and a liquid crystal display device. The sealing adhesive includes a modified epoxy compound obtained by chemical bonding of a piperidine compound with an epoxy compound, wherein the modified epoxy compound contains a nitrogen-hydrogen bond. The method of preparing the above sealing adhesive includes: subjecting a piperidine compound and an epoxy compound to a chemical reaction to obtain a modified epoxy compound; and mixing about 10 to 90 parts by eight of the modified epoxy compound, about 10 to 90 parts by weight of an acrylic resin, about 2 to 5 parts by weight of a filler, about 5 to 10 parts by weight of a heat curing agent and about 3 to 10 parts by weight of a
(Continued)

photoinitiator to obtain a sealing adhesive. The liquid crystal display device includes the sealing adhesive described above.

13 Claims, 1 Drawing Sheet

(51) Int. Cl.
  *C08G 59/14* (2006.01)
  *C09K 3/10* (2006.01)
  *C09J 11/06* (2006.01)
(52) U.S. Cl.
  CPC ............. *G02F 1/1339* (2013.01); *C09J 11/06* (2013.01); *C09K 2200/0625* (2013.01)

(56) References Cited

FOREIGN PATENT DOCUMENTS

| CN | 103131364 A | | 6/2013 |
|---|---|---|---|
| CN | 103881629 | | 6/2014 |
| CN | 105331314 A | * | 2/2016 |
| CN | 105331314 A | | 2/2016 |
| CN | 105802559 A | | 7/2016 |

OTHER PUBLICATIONS

Feb. 24, 2018—(CN) First Office Action Appn 201610232626.4 with English Tran.

* cited by examiner

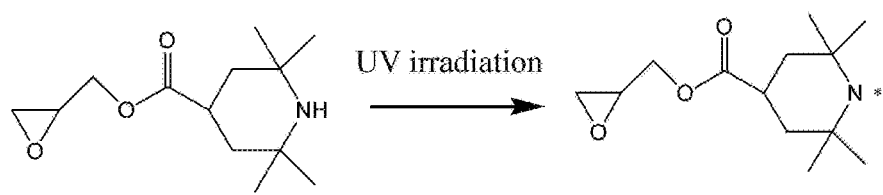

SEALING ADHESIVE, ITS PREPARATION METHOD, AND LIQUID CRYSTAL DISPLAY DEVICE

The application is a U.S. National Phase Entry of International Application No. PCT/CN2017/078780 filed on Mar. 30, 2017, designating the United States of America and claiming priority to Chinese Patent Application No. 201610232626.4 filed on Apr. 14, 2016. The present application claims priority to and the benefit of the above-identified applications and the above-identified applications are incorporated by reference herein in their entirety.

TECHNICAL FIELD

The present disclosure relates to a sealing adhesive and a liquid crystal display device.

BACKGROUND

Liquid crystal displays have become increasingly popular in recent years owing to their advantages such as low operating voltage, low power consumption and radiation, light weight and thin design.

With the improvement of living standards, increasingly high standards are required for display performance including high brightness, high contrast and high response speed. Standards for the image quality of the entire display are also increasingly high, such as mura and image sticking, wherein mura refers to the phenomenon of a variety of traces resulting from uneven brightness of the display; image sticking, also named as image persistence, refers to the phenomenon of afterimage when the same still picture has been displayed for a long time and then the display content is changed.

Image sticking affects image quality seriously. In the prior art, the problem of image sticking is generally solved by the following two methods. The first method tries to reduce the occurrence chance of image sticking by changing the design of thin film transistor (TFT). But the design change often alters the previous design scheme only after image sticking appears, and thus changing the design of the thin film transistor takes efforts almost close to developing a new product, and there is no guarantee that the image problem will be improved. Moreover, the TFT design change will make the cycle of the product development longer and double the development cost. The second method tries to reduce the occurrence chance of image sticking by changing the alignment film material and its manufacturing process. However, change of the manufacturing process generally refers to change of the thickness of the metal film layer (the metal film layer may include a Mo/Al layer), the thickness of the alignment film and the thickness of the transparent over coat (OC), so as to delay the release time of ion impurities. But change of the alignment film material and its manufacturing process can only delay the time when the image sticking appears, and cannot actually make the image sticking disappear. Therefore, the two methods can not fundamentally solve the problem of image sticking.

SUMMARY

The present disclosure provides a sealing adhesive, its preparation method, and a liquid crystal display device, to solve the problem in the prior art that the liquid crystal display device has a serious image sticking.

According to an aspect of the present disclosure, there is provided a sealing adhesive comprising a modified epoxy compound, wherein the modified epoxy compound is obtained by chemical bonding of a piperidine compound with an epoxy compound and contains a nitrogen-hydrogen bond.

Optionally, according to the sealing adhesive of an embodiment of the present disclosure, the piperidine compound contains a carboxyl group.

For example, according to the sealing adhesive of an embodiment of the present disclosure, the piperidine compound is a compound of Formula I:

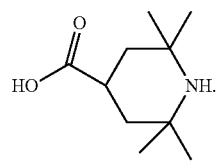

Formula I

Optionally, according to the sealing adhesive of an embodiment of the present disclosure, the epoxy compound is a compound of Formula II:

Formula II

Optionally, according to the sealing adhesive of an embodiment of the present disclosure, the sealing adhesive comprises about 10 to 90 parts by weight of an acrylic resin and about 10 to 90 parts by weight of the modified epoxy compound.

Optionally, according to the sealing adhesive of an embodiment of the present disclosure, the sealing adhesive further comprises about 2 to 5 parts by weight of a filler, about 5 to 10 parts by weight of a heat curing agent and about 3 to 10 parts by weight of a photoinitiator.

According to another aspect of the present disclosure, there is provided a method of preparing a sealing adhesive, comprising:

a step of preparing a modified epoxy compound: subjecting a piperidine compound and an epoxy compound to a chemical reaction to obtain a modified epoxy compound; and a mixing step: mixing about 10 to 90 parts by eight of the modified epoxy compound, about 10 to 90 parts by weight of an acrylic resin, about 2 to 5 parts by weight of a filler, about 5 to 10 parts by weight of a heat curing agent and about 3 to 10 parts by weight of a photoinitiator to obtain the sealing adhesive.

Optionally, according to the method of an embodiment of the present disclosure, the piperidine compound is a compound of Formula I:

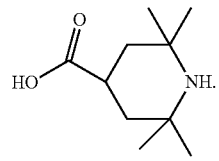

Formula I

Optionally, according to the method of an embodiment of the present disclosure, the epoxy compound is a compound of formula II:

Formula II and the compound of Formula I and the compound of Formula II are bonded via an ester bond.

According to another aspect of the present disclosure, there is provided a liquid crystal device, comprising the sealing adhesive of the present disclosure.

The sealing adhesive according to an embodiment of the present disclosure comprises an epoxy compound modified with a piperidine compound, wherein the modified epoxy compound is capable of generating free radicals under UV irradiation, and the free radicals generated are capable of adsorbing ion impurities.

According to the method of an embodiment of the present disclosure, the sealing adhesive obtained comprises an epoxy compound modified with a piperidine compound, wherein the modified epoxy compound is capable of generating free radicals under UV irradiation, and the free radicals generated are capable of adsorbing ion impurities.

The liquid crystal display device according to an embodiment of the present disclosure comprises the sealing adhesive of the present disclosure, wherein the modified epoxy compound in the sealing adhesive generates free radicals under UV irradiation, and the free radicals generated are capable of adsorbing ion impurities produced upon driving the liquid crystal display device; the ion impurities are desorbed after the driving voltage applied to the liquid crystal display device disappears and are then formed into ketones or alcohols, thereby reducing the image sticking of the liquid crystal display device and improving the display quality.

BRIEF DESCRIPTION OF THE DRAWINGS

FIG. 1 is a mechanism diagram for the generation of free radicals of an epoxy compound modified with a piperidine compound according to an embodiment of the present disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

According to an aspect of the present disclosure, there is provided a sealing adhesive, comprising a modified epoxy compound obtained by chemical bonding of a piperidine compound with an epoxy compound, wherein the modified epoxy compound contains a nitrogen-hydrogen bond.

The sealing adhesive according to an embodiment of the present disclosure comprises a modified epoxy compound obtained by chemical bonding of a piperidine compound with an epoxy compound, wherein the chemical bond comprises an ester bond. The nitrogen-hydrogen bond in the modified epoxy compound refers to the nitrogen-hydrogen bond derived from a piperidine ring. The nitrogen-hydrogen bond generates free radicals under UV irradiation, and the free radicals generated are capable of capturing ion impurities. The use of the sealing adhesive in a liquid crystal display device can reduce the image sticking of the liquid crystal display device, wherein the ion impurities include alkyl groups and fluorine groups introduced to the liquid crystal, and other organics introduced to the sealing adhesive, a color filter (CF) material and an alignment film.

According to an embodiment of the sealing adhesive of the present disclosure, the piperidine compound may contain a carboxyl group.

According to the sealing adhesive of an embodiment of the present disclosure, the piperidine compound may contain a carboxyl group which is capable of forming an ester group with the hydroxyl group in the epoxy compound, thereby bonding the piperidine compound to the epoxy compound to modify the epoxy compound.

According to an embodiment of the sealing adhesive of the present disclosure, the piperidine compound is preferably the compound of Formula I:

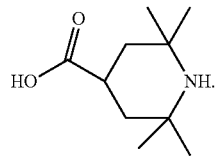

Formula I

The carboxyl group in the piperidine compound of Formula I and the hydroxyl group in the epoxy compound form an ester group to achieve modification of the epoxy compound by the piperidine compound, wherein the nitrogen-hydrogen bond in the modified epoxy compound is capable of generating free radicals under UV irradiation, and the free radicals generated are capable of adsorbing ion impurities.

According to an embodiment of the sealing adhesive of the present disclosure, the epoxy compound may be the compound of Formula II:

Formula II

The hydroxyl-containing epoxy compound of Formula II is capable of reacting with the carboxyl-containing piperidine compound (such as the piperidine compound of Formula I) to form an ester group so as to achieve modification of the epoxy compound by the piperidine compound. As shown in FIG. 1, the nitrogen-hydrogen bond in the epoxy compound formed by modifying the compound of Formula II with the compound of Formula I generates free radicals under UV irradiation, wherein the free radicals generated are capable of adsorbing ion impurities.

According to an embodiment of the sealing adhesive of the present disclosure, the sealing adhesive may comprise about 10 to 90 parts by weight of an acrylic resin and about 10 to 90 parts by weight of the modified epoxy compound.

The modified epoxy compound and the acrylic resin are mixed at a certain ratio according to the sealing adhesive of the present disclosure. The performance that the sealing adhesive adsorbs ion impurities can be adjusted upon requirement, and sealing adhesives with different properties (such as fast curing, low temperature curing, strong adhesion, etc.) can be obtained by adjusting the ratio of the modified epoxy compound to the acrylic resin according to different requirements.

According to an embodiment of the sealing adhesive of the present disclosure, the sealing adhesive may further comprise about 2 to 5 parts by weight of a filler, about 5 to 10 parts by weight of a heat curing agent and about 3 to 10 parts by weight of a photoinitiator.

A certain proportion of an additive(s) may be added according to the sealing adhesive of the present disclosure to adjust the properties (such as fast curing, low temperature curing, strong adhesion, etc.) of the sealing adhesive, wherein the filler is an organic filler and/or an inorganic filler, preferably a resin, a silica, a glass fiber, and the like; the heat curing agent is preferably an aliphatic amine or an aromatic amine; the photoinitiator is preferably a diazonium salt, a diaryliodonium salt, a triaryliodonium salt, an alkyl-sulfonium salt, or an iron-arene salt.

According to another aspect of the present disclosure, there is provided a method of preparing a sealing adhesive, comprising:

a step of preparing a modified epoxy compound: subjecting a piperidine compound and an epoxy compound to a chemical reaction to obtain a modified epoxy compound; and a mixing step: mixing about 10 to 90 parts by weight of the modified epoxy compound, about 10 to 90 parts by weight of an acrylic resin, about 2 to 5 parts by weight of a filler, about 5 to 10 parts by weight of a heat curing agent and about 3 to 10 parts by weight of a photoinitiator to obtain the sealing adhesive.

According to an embodiment of the method of the present disclosure, the piperidine compound is a compound of Formula I:

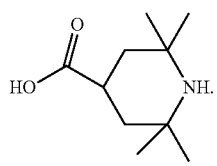

Formula I

According to an embodiment of the method of the present disclosure, the epoxy compound is a compound of formula II:

Formula II wherein the compound of Formula I and the compound of Formula II are bonded via an ester bond.

According to the method of an embodiment of the present disclosure, the sealing adhesive obtained comprises an epoxy compound modified with a piperidine compound, wherein the modified epoxy compound is capable of generating free radicals under UV irradiation, and the free radicals generated are capable of adsorbing ion impurities.

The liquid crystal display device according to another aspect of the present disclosure comprises the sealing adhesive of the present disclosure.

The liquid crystal display device according to the present disclosure comprises the above sealing adhesive, wherein the modified epoxy compound in the sealing adhesive generates free radicals under UV irradiation, and the free radicals generated are capable of adsorbing ion impurities produced upon driving the liquid crystal display device. The ion impurities are desorbed after the driving voltage applied to the liquid crystal display device disappears and are then formed into ketones or alcohols, thereby reducing the image sticking of the liquid crystal display device and improving the display quality.

In view of the above, there are a variety of optional factors for the sealing adhesive and the liquid crystal display device of the present disclosure. A variety of embodiments may be combined according to the claims of the present invention, and thus the technical solutions combined in accordance with the claims of the present invention are within the protection scope of the present invention. The method of preparing the sealing adhesive of the present invention will be further described below with reference to specific embodiments.

Among them, the modified epoxy compound in Examples 1 to 5 is a modified resin obtained by modifying the epoxy compound of Formula II with the piperidine compound of Formula I via an ester bond, wherein the modified resin contains a nitrogen-hydrogen bond which is capable of generating free radicals under UV irradiation.

Example 1

10 parts by weight of an acrylic resin, 10 parts by weight of a modified epoxy compound, 2 parts by weight of a filler, 5 parts by weight of a heat curing agent and 3 parts by weight of a photoinitiator were mixed to obtain a sealing adhesive.

Example 2

90 parts by weight of an acrylic resin, 90 parts by weight of a modified epoxy compound, 5 parts by weight of a filler, 10 parts by weight of a heat curing agent and 10 parts by weight of a photoinitiator were mixed to obtain a sealing adhesive.

Example 3

20 parts by weight of an acrylic resin, 80 parts by weight of a modified epoxy compound, 4 parts by weight of a filler, 8 parts by weight of a heat curing agent and 8 parts by weight of a photoinitiator were mixed to obtain a sealing adhesive.

Example 4

40 parts by weight of an acrylic resin, 70 parts by weight of a modified epoxy compound, 3 parts by weight of a filler, 7 parts by weight of a heat curing agent and 9 parts by weight of a photoinitiator were mixed to obtain a sealing adhesive.

Example 5

50 parts by weight of an acrylic resin, 80 parts by weight of a modified epoxy compound, 4 parts by weight of a filler, 6 parts by weight of a heat curing agent and 9 parts by weight of a photoinitiator were mixed to obtain a sealing adhesive.

Sealing adhesives capable of adsorbing ion impurities were obtained according to Examples 1 to 5. The sealing adhesives obtained from Examples 1 to 5 were used in a liquid crystal display device. The liquid crystal display devices obtained had a peripheral image sticking decreased by about 60%, and an image sticking level decreased by 1-2 grades, compared with comparative liquid crystal display devices having completely the same conditions except using a traditional sealing adhesive.

It shall be noted that the technical features in the embodiments of the present application can be used in any combination in the absence of conflict.

The above are merely exemplary embodiments of the present invention, and the protection scope of the present invention is not limited thereto, which is yet determined by the appended claims.

The present application claims the priority of the Chinese patent application No. 201610232626.4 submitted on Apr. 14, 2016, the disclosure of which is incorporated herein by reference as part of the present application.

The invention claimed is:

1. A sealing adhesive, comprising a modified epoxy compound obtained by chemical bonding of a piperidine compound with an epoxy compound, wherein the modified epoxy compound contains a nitrogen-hydrogen bond, and the piperidine compound contains a carboxyl group.

2. The sealing adhesive according to claim 1, wherein the piperidine compound is a compound of Formula I:

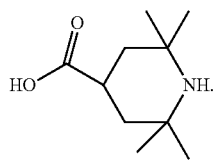

Formula I

3. The sealing adhesive according to claim 1, wherein the epoxy compound is a compound of Formula II:

Formula II

4. The sealing adhesive according to claim 1, wherein the sealing adhesive comprises about 10 to 90 parts by weight of an acrylic resin and about 10 to 90 parts by weight of the modified epoxy compound.

5. The sealing adhesive according to claim 4, wherein the sealing adhesive further comprises about 2 to 5 parts by weight of a filler, about 5 to 10 parts by weight of a heat curing agent and about 3 to 10 parts by weight of a photoinitiator.

6. A method of preparing a sealing adhesive, comprising:
    a step of preparing a modified epoxy compound: subjecting a piperidine compound and an epoxy compound to a chemical reaction to obtain a modified epoxy compound, wherein the piperidine compound contains a carboxyl group; and
    a mixing step: mixing about 10 to 90 parts by weight of the modified epoxy compound, about 10 to 90 parts by weight of an acrylic resin, about 2 to 5 parts by weight of a filler, about 5 to 10 parts by weight of a heat curing agent and about 3 to 10 parts by weight of a photoinitiator, to obtain the sealing adhesive.

7. The method according to claim 6, wherein the piperidine compound is a compound of Formula I:

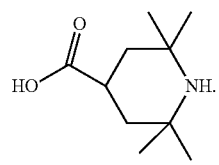

Formula I

8. The method according to claim 7, wherein the epoxy compound is a compound of formula II:

Formula II and the compound of Formula I and the compound of Formula II are bonded via an ester bond.

9. A liquid crystal display device, comprising the sealing adhesive according to claim 1.

10. A liquid crystal display device, comprising the sealing adhesive according to claim 2.

11. A liquid crystal display device, comprising the sealing adhesive according to claim 3.

12. A liquid crystal display device, comprising the sealing adhesive according to claim 4.

13. A liquid crystal display device, comprising the sealing adhesive according to claim 5.

* * * * *